(12) United States Patent
Bell et al.

(10) Patent No.: US 12,043,713 B2
(45) Date of Patent: *Jul. 23, 2024

(54) POLYETHYLENE FILM

(71) Applicant: W.L. Gore & Associates, Inc., Newark, DE (US)

(72) Inventors: Brent Bell, Lincoln University, PA (US); Shaun Leone, Elkton, MD (US); Guy Sbriglia, Christiana, PA (US)

(73) Assignee: W.L. Gore & Associates, Inc., Newark, DE (US)

( * ) Notice: Subject to any disclaimer, the term of this patent is extended or adjusted under 35 U.S.C. 154(b) by 718 days.

This patent is subject to a terminal disclaimer.

(21) Appl. No.: 17/259,574

(22) PCT Filed: Jul. 30, 2019

(86) PCT No.: PCT/US2019/044082
§ 371 (c)(1),
(2) Date: Jan. 12, 2021

(87) PCT Pub. No.: WO2020/028328
PCT Pub. Date: Feb. 6, 2020

(65) Prior Publication Data
US 2021/0317276 A1    Oct. 14, 2021

Related U.S. Application Data

(60) Provisional application No. 62/712,249, filed on Jul. 31, 2018.

(51) Int. Cl.
| | | |
|---|---|---|
| B32B 27/32 | (2006.01) | |
| B32B 5/26 | (2006.01) | |
| B32B 27/40 | (2006.01) | |
| B32B 37/12 | (2006.01) | |
| C08J 5/18 | (2006.01) | |

(52) U.S. Cl.
CPC ............ C08J 5/18 (2013.01); B32B 5/262 (2021.05); B32B 27/32 (2013.01); B32B 37/12 (2013.01); B32B 27/40 (2013.01); *B32B 2260/046* (2013.01); *B32B 2437/00* (2013.01); *C08J 2323/06* (2013.01)

(58) Field of Classification Search
CPC ... B32B 27/32; B32B 27/40; B32B 2260/046; B32B 27/12; B32B 2250/02; B32B 2250/03
See application file for complete search history.

(56) References Cited

U.S. PATENT DOCUMENTS

| | | | |
|---|---|---|---|
| 4,443,511 A | 4/1984 | Worden et al. | |
| 4,613,544 A * | 9/1986 | Burleigh | A61L 15/425 427/245 |
| 4,818,596 A * | 4/1989 | Cook | C08J 9/26 427/512 |
| 5,425,865 A * | 6/1995 | Singleton | B01D 67/0093 427/430.1 |
| 9,126,390 B2 | 9/2015 | Imai | |
| 9,233,520 B2 | 1/2016 | Kelsey | |
| 9,238,344 B2 | 1/2016 | Kelsey et al. | |
| 9,950,504 B2 | 4/2018 | Imai | |
| 2008/0143012 A1 | 6/2008 | Norvell et al. | |
| 2010/0071115 A1 | 3/2010 | Sadato | |
| 2013/0260111 A1 | 10/2013 | Kelsey et al. | |
| 2016/0052237 A1* | 2/2016 | Kim | B32B 7/12 156/331.7 |
| 2021/0163706 A1* | 6/2021 | De Bont | C08J 9/42 |
| 2021/0164737 A1* | 6/2021 | Nishioka | F28D 21/0014 |
| 2021/0332202 A1* | 10/2021 | Bell | B32B 5/022 |

FOREIGN PATENT DOCUMENTS

| | | | | |
|---|---|---|---|---|
| EP | 0184392 B1 | 1/1993 | | |
| EP | 0463835 B1 | 2/1996 | | |
| JP | 1986190535 | 8/1986 | | |
| JP | 1993-001165 A | 1/1993 | | |
| JP | 1994067604 | 8/1994 | | |
| JP | 1994031226 | 2/1997 | | |
| JP | 1999268118 | 10/1999 | | |
| JP | 2000-80197 A * | 3/2000 | ............... | C08J 9/42 |
| JP | 2002367589 | 12/2002 | | |
| JP | 2014-061505 | 4/2014 | | |
| JP | 2014-61505 A * | 4/2014 | ............ | B01D 71/26 |
| JP | 2016522103 | 7/2016 | | |
| JP | 2017-020779 | 1/2017 | | |
| JP | 2017-517615 A | 6/2017 | | |
| JP | 2017-519078 A | 7/2017 | | |
| JP | 2021532288 | 11/2021 | | |
| WO | 9004175 A1 | 4/1990 | | |
| WO | 201867529 A1 | 4/2018 | | |

OTHER PUBLICATIONS

JP 2000-80197 A (Mar. 21, 2000); machine translation. (Year: 2000).*

* cited by examiner

*Primary Examiner* — Rip A Lee

(74) *Attorney, Agent, or Firm* — GREENBERG TRAURIG, LLP

(57) ABSTRACT

A novel modified treated porous polyethylene membrane is imbibed with a hydrophilic polymer and heat treated to form a film having improved hand and noise. The films are useful to produce articles, especially textile laminates that can form waterproof breathable apparel.

18 Claims, 3 Drawing Sheets

POLYETHYLENE FILM

TECHNICAL FIELD OF THE DISCLOSURE

The present disclosure relates to waterproof, breathable polyethylene film composites that are useful in a variety of applications. The films can be used by themselves or can be laminated to other layers to form multilayer laminates.

BACKGROUND OF THE DISCLOSURE

Garments and other types of apparel, such as shoes, gloves and hats often incorporate a waterproof breathable layer to keep a wearer dry in wet conditions. These garments can be formed using laminates of the breathable waterproof layer and one or more textiles. Composite waterproof breathable films made using porous PTFE membranes and hydrophilic polyurethane are currently being used to make GORE-TEX® textile laminates. The PTFE membranes are microporous and generally hydrophobic wherein the pore size of the membrane is larger than individual molecules of water, but the pores are much smaller than drops of water. Water vapor is able to pass through the material while water droplets are prevented from passing from one side of the membrane to the other.

While PTFE microporous membranes work well, porous polyurethane membranes have also been developed for use in apparel, but these membranes can lack durability and, in some cases, can be dissolved by certain commonly used products, for example, nail polish or bug sprays. These membranes can also have limitations where the membrane is stiff and noisy when the wearer moves. There is a continuing need to produce membranes that have excellent waterproofness and breathability as well as having good hand and low noise when an article, such as a garment, incorporating the membrane is moved or flexed.

SUMMARY OF THE DISCLOSURE

The disclosure relates to a first embodiment that is a film comprising: A) a porous polyethylene membrane comprising: i) a weight average molecular weight of greater than 500,000 grams/mole;
ii) a porosity of at least 40%; iii) a Gurley number of less than 200 seconds; and B) a hydrophilic polymer filing at least a portion of the pores of the porous polyethylene membrane; wherein the film comprises a) a moisture vapor transmission rate of greater than or equal to 2500 grams/meter$^2$/day; and b) a weight of less than 30 grams/meter$^2$. The disclosure also relates to articles comprising the film.

In a second embodiment the disclosure relates to the film of embodiment 1 wherein the polyethylene membrane has a first side and a second side and the hydrophilic polymer is applied to the first side of the polyethylene membrane resulting in filling at least a portion of the pores and a cap layer of the hydrophilic polymer on the first side of the polyethylene membrane.

In a third embodiment the disclosure relates to the film of any one of embodiments 1 or 2 wherein the second side of the polyethylene membrane displays a shish-kebab structure.

In a fourth embodiment the disclosure relates to the film of any one of embodiments 1 to 3 wherein the substantially all of the pores in the porous polyethylene membrane are filled with the hydrophilic polymer.

In a fifth embodiment the disclosure relates to the film of any one of embodiments 1 to 4 wherein the hydrophilic polymer is a polyurethane, polyamide, polyester, ionomer, or a copolymer or a copolymer or a combination thereof.

In a sixth embodiment the disclosure relates to the film of any one of embodiments 1 to 5 wherein the porous polyethylene membrane comprises a weight of less than 10 grams/meter$^2$.

In a seventh embodiment the disclosure relates to the film of any one of embodiments 1 to 6 wherein the porous polyethylene membrane comprises a porosity of greater than or equal to 60%.

In an eighth embodiment the disclosure relates to the film of any one of embodiments 1 to 7 wherein the weight ratio of hydrophilic polymer to porous polyethylene is in the range of from 30.0 to 0.5.

In a ninth embodiment the disclosure relates to the article comprising the film of any one of embodiments 1 to 8.

In a tenth embodiment the disclosure relates to the article of embodiment 9 wherein the film is a laminate comprising at least one other layer that is adjacent to the film.

In a eleventh embodiment the disclosure relates to the article of any one of embodiments 9 or 10 wherein the at least one other layer is a textile layer, a polymer film layer, a natural leather layer, a synthetic leather layer, a fleece layer or a combination thereof.

In a twelfth embodiment the disclosure relates to the article of any one of embodiments 9 to 11 wherein the at least one other layer is a textile layer.

In a thirteenth embodiment the disclosure relates to the article of any one of embodiments 9 to 12 wherein the layers of the laminate are adhered to one another using a continuous or a discontinuous adhesive.

In a fourteenth embodiment the disclosure relates to the article of any one of embodiments 9 to 13 wherein the adhesive is a thermoplastic or a crosslinkable adhesive.

In a fifteenth embodiment the disclosure relates to the article of any one of embodiments 9 to 14 wherein the article is a garment In a sixteenth embodiment the disclosure relates to the article of embodiment 15 wherein the garment is a jacket, a coat, a shirt, pants, a glove, a hat, a shoe, coveralls or at least a portion thereof.

In a seventeenth embodiment the disclosure relates to the article of any one of embodiments 15 or 16 wherein the film is on the exterior of the garment or the film is not on the exterior of the garment.

In an eighteenth embodiment the disclosure relates to the article of any one of embodiments 15 to 17 wherein the garment is waterproof.

DETAILED DESCRIPTION

Figure 1:
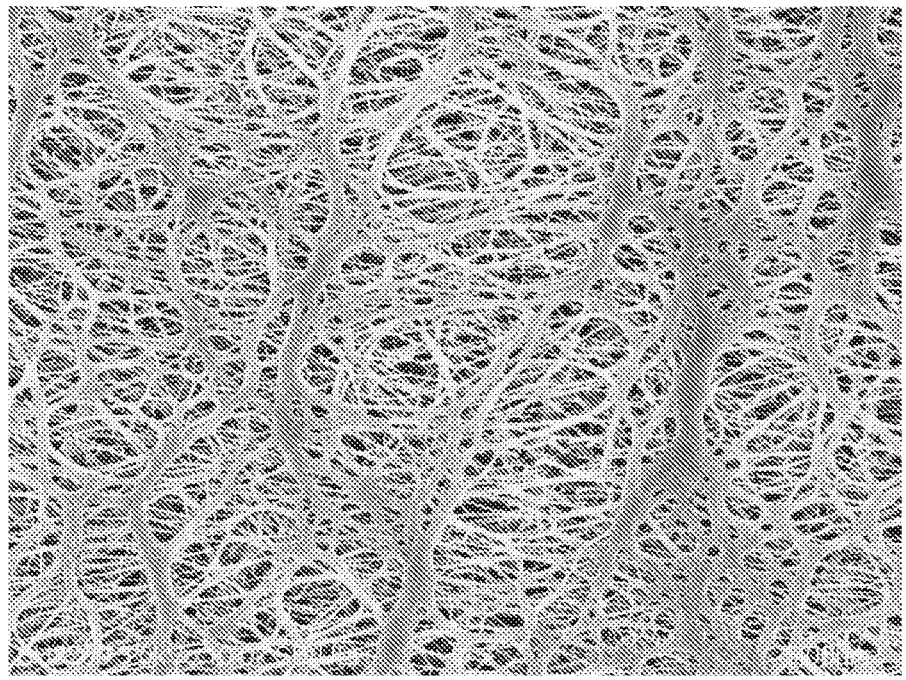
FIG. 1 shows a scanning electron micrograph (SEM) of a porous polyethylene membrane prior to heat treatment.

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

Unless otherwise disclosed, the terms "a" and "an" as used herein are intended to encompass one or more (i.e., at least one) of a referenced feature.

The features and advantages of the present disclosure will be more readily understood by those of ordinary skill in the art from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described as a combination in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges. Also, the disclosure of these ranges is intended as a continuous range including each and every value between the minimum and maximum values.

As used herein, the term "membrane" means a polymer in the form of an essentially two dimensional sheet, wherein the length and the width are both much greater than the thickness, for example both the length and the width are at least 100 times the thickness. In some embodiments, the membrane is a microporous membrane having a structure that allows, for example, water vapor to pass through the thickness of the membrane without liquid water being able to penetrate from one side of the membrane to the other. On average, the pore size is on the order of several nanometers to approximately one micrometer.

The term "film" means a membrane wherein the pores have been at least partially filled with a polymer such that the flow of gases or liquids does not occur through open pore channels in the membrane. In some embodiments, the polymer at least partially filling the pores can be a hydrophilic polymer.

The term "hydrophilic polymer" refers to a polymer that can allow substantial amounts of water to be transferred through the film by absorbing water on one side of the film where the water concentration is higher, and desorbing or evaporating it on the opposite side of the film where the water vapor concentration is lower. In some embodiments, a layer of the hydrophilic polymer that is 10 micrometers thick can have a moisture vapor transmission rate of greater than or equal to 5,000 g/meter$^2$/day, or greater than or equal to 10,000 g/meter$^2$/day.

The phrases "porous polyethylene membrane" and "polyethylene membrane" are used interchangeably throughout the specification. Unless specifically stated otherwise, both phrases mean a porous polyethylene membrane having i) a weight average molecular weight greater than 500,000 g/mol; ii) a porosity of at least 40%; and iii) a Gurley number of less than 200 seconds. Under magnification, the porous polyethylene membrane shows a fibrillated structure of polyethylene fibrils, and with sufficient magnification it is possible to see one or more polyethylene fibrils, optionally three or more of the fibrils can be interconnected by one or more intersections of the three or more fibrils.

As used herein, the term "polyethylene" means a polyethylene polymer having less than 5 percent by weight of one or more comonomers. In some embodiments, the polyethylene is free from any fluorine containing comonomers, and, in still further embodiments, the polyethylene is polyethylene homopolymer.

The present disclosure relates to a film comprising A) a porous polyethylene membrane and B) a hydrophilic polymer wherein the hydrophilic polymer fills at least a portion of the pores of the porous polyethylene membrane. This film will not leak due to contamination by oils, detergents or other contact angle reducing materials and as such it is waterproof. Furthermore, articles comprising the film have greater durability in the field and in the wash than other non-air permeable hydrophilic films that do not include the porous polyethylene membrane as a structural support. The porous polyethylene membrane has a weight average molecular weight of greater than 500,000 grams per mole (g/mol). In some embodiments, the porous polyethylene has a weight average molecular weight of greater than 750,000 g/mol. In still further embodiments, the porous polyethylene has a weight average molecular weight of greater than 1,000,000 g/mol. In still further embodiments, the polyethylene has a weight average molecular weight of greater than 1,500,000 grams per mole or greater than to 1,750,000 grams per mole. In still further embodiments, the polyethylene has a weight average molecular weight of greater than 2,000,000 grams per mole, 3,000,000 grams per mole, 4,000,000 grams per mole, 5,000,000 grams per mole or greater than 8,000,000 grams per mole.

The polyethylene membrane is a porous polyethylene membrane wherein the membrane has a porosity of at least 40%. In some embodiments, the porosity of the porous polyethylene membrane can be at least 50% or at least 60% or at least 70% or at least 80%. The porosity, $\phi$, of the membrane can be calculated by measuring the mass per unit area of the membrane, MPA, and the thickness of the membrane, t, and using the relationship $\phi=(1-\text{MPA}/(t*\rho))*100$, where $\rho$ is the density of the membrane polymer. The porous polyethylene membrane can also have a Gurley of less than 200 seconds or less than 100 seconds or less than or equal to 90 seconds or less than or equal to 80 seconds or less than or equal to 70 seconds or less than or equal to 60 seconds or less than or equal to 50 seconds or less than or equal to 40 seconds or less than 10 seconds.

The porous polyethylene membrane can have a relatively light weight, for example, less than or equal to 10 grams per meter$^2$ (gsm). In other embodiments, the porous polyethylene membrane can have a weight of less than or equal to 9 gsm or less than or equal to 8 gsm or less than or equal to 7 gsm or less than or equal to 6 gsm or less than or equal to 5 gsm or less than or equal to 4 gsm or less than or equal to 3 gsm or less than or equal to 2 gsm.

The porous polyethylene membrane can be colored or uncolored. The use of a porous polyethylene membrane can provide a valuable aesthetic quality to the film and articles comprising the film, especially when the porous polyethylene membrane is visible in the article. Any of the known colorization methods can be used. For example, the porous polyethylene membrane can be pigmented throughout the bulk of the membrane via the addition of pigments or dyes during the membrane formation process. In other embodiments, the porous polyethylene membrane can be colorized after formation via known printing and dyeing processes. In still further embodiments, the porous polyethylene membrane can be free from or essentially free from any added color and color can be added at one or more steps during the film formation processes described herein.

The film also comprises a hydrophilic polymer that fills at least a portion of the pores of the porous polyethylene membrane. The phrase "filling at least a portion of the pores" means that the hydrophilic polymer is imbibed into the pores of the polyethylene membrane and fills the pores to the point that no airflow (a Gurley number of greater than or equal to 1000 seconds) can be determined through the area of the film containing the hydrophilic polymer. In other words, the hydrophilic polymer is not simply a coating on the walls of the polyethylene membrane that define the pores. While some voids may be present, it is thought that the hydrophilic polymer forms a contiguous layer within the area of the porous polyethylene membrane to which the hydrophilic polymer is applied. In other embodiments, the hydrophilic polymer forms a continuous layer free from or essentially free from any voids within the area of the porous polyethylene membrane to which the hydrophilic polymer is applied. In still further embodiments, substantially all of the pores of the porous polyethylene membrane are filled with the hydrophilic polymer.

The polyethylene membrane has a first side and a second side. The hydrophilic polymer can be applied to the first side of the porous polyethylene membrane and the hydrophilic polymer can permeate at least a portion of the pores to form the film, resulting in filling at least a portion of the pores of the polyethylene membrane. The first side of the polyethylene membrane can comprise a cap layer of the hydrophilic polymer on the exterior of the membrane. The cap layer or amount of the hydrophilic polymer on the first side of the porous polyethylene membrane has essentially no upper limit. However if the cap layer is too thick, then the beneficial properties of the porous polyethylene membrane cannot be realized, therefore, the upper limit of the cap is about 50 micrometers. In some embodiments, the cap layer of the hydrophilic copolymer can be up to 40 micrometers or up to 30 micrometers or up to 20 micrometers or up to 15 micrometers thick on the first surface of the polyethylene membrane. In some embodiments, the cap layer of the hydrophilic polymer can be up to about 10 micrometers thick on the first surface of the polyethylene membrane. In other embodiments, the cap layer on the first side of the polyethylene membrane is less than or equal to 10 micrometers thick, or less than or equal to 8 micrometers or less than or equal to 6 micrometers or less than or equal to 4 micrometers or less than or equal to 2 micrometers. In still further embodiments, no cap layer of the hydrophilic polymer is present on the first surface of the polyethylene membrane. The second side of the polyethylene membrane can be essentially free from any of the hydrophilic polymer on the surface, for example, no hydrophilic polymer of a thickness more than 1 micrometer above the surface of the polyethylene membrane. In some embodiments, less than the entire thickness of the porous polyethylene membrane is filled with the hydrophilic polymer, for example, less than or equal to 90% of the thickness of the polyethylene membrane may be filled with the hydrophilic polymer, with the proviso that enough hydrophilic polymer is imbibed so as to provide the porous polyethylene film with a Gurley number of greater than or equal to 1000 seconds. In other embodiments, essentially the entire thickness of the porous polyethylene membrane is filled with the hydrophilic polymer. As used herein, the phrase "essentially the entire thickness" means that at least 90% of the thickness of the porous polyethylene membrane is filled with the hydrophilic polymer. In other embodiments, a hydrophilic polymer can be applied to the second side of the polyethylene membrane as well as the first side. The hydrophilic polymer applied to the second side may be the same or different from the hydrophilic polymer applied to the first side. In still further embodiments, the film can be a composite film wherein a hydrophilic polymer is applied to a first side of a first porous polyethylene membrane with a sufficient amount of the hydrophilic polymer applied to the first side of the porous polyethylene membrane so as to form a cap layer and a second porous polyethylene membrane that may be the same or different as the first porous polyethylene membrane, is thereafter bonded to the laminate via the cap layer of the hydrophilic polymer. This can result in a 3-layer structure having 2 porous polyethylene membranes adhered to one another with the hydrophilic polymer as the layer in between the two porous polyethylene membranes. If desired, an additional layer or layers of hydrophilic polymer may be applied to one or both of the exterior sides of the composite film.

In some embodiments, the hydrophilic polymer may be applied to the porous polyethylene membrane in a continuous manner, so that essentially 100 percent of the surface area of the porous polyethylene membrane comprises the hydrophilic polymer. As used in this context, the term "continuous" means that the full width or nearly the full width of the porous polyethylene membrane is coated with the hydrophilic polymer. It should be noted that in many coating processes, the edges of a roll of material may not be coated due to frames or dams at the edges not allowing the entire width of the membrane to be coated. In other embodiments, the hydrophilic polymer may be applied to the porous polyethylene membrane in a discontinuous manner. As used in this context, the term "discontinuous" means that less than 100 percent of the surface area of the porous polyethylene membrane is coated with the hydrophilic polymer and that portions of the non-edge areas of the porous polyethylene membrane do not contain the hydrophilic polymer. For example, a hydrophilic polymer applied to the porous polyethylene membrane as a series of dots or as a grid of orthogonal lines are to be considered as discontinuous coatings. The area percent of the porous polyethylene membrane that is filled with the hydrophilic polymer can be in the range of from greater than or equal to 20 percent to 100 percent or from 30 percent to less than 100 percent or from 40 percent to less than 100 percent or from 50 percent to less than 100 percent or from 60 to less than 100 percent or from 70 to less than 100 percent or from 80 to less than 100 percent or from 90 to less than 100 percent. In other embodiments, the application of the hydrophilic polymer can be done in a manner that produces a random or non-random pattern of dots, polygons, parallel lines, intersecting lines, straight lines, curved lines or any combination thereof in order to provide the desired percent by area coverage. If oleophobicity is desired in such films, it may be desirable in certain embodiments to include an oleophobic coating, as described otherwise herein.

As a weight ratio, the film can have a ratio of the weight of the hydrophilic polymer to the weight of the porous polyethylene membrane in the range of from 30.0 to 0.5. In other embodiments, the weight ratio of the hydrophilic polymer to the polyethylene membrane can be 20.0, 15.0, 10.0, 9.0, 8.0, 7.0, 6.0, 5.0, 4.0, 3.0, 2.0, 1.0, 0.9, 0.8, 0.7, 0.6, 0.5 or any weight ratio in between those numbers.

Suitable hydrophilic polymers can include, for example, polyurethane, polyamide, polyester, ionomer, or a copolymer or a combination thereof. In other embodiments, nearly any suitable hydrophilic polymer could be used provided that the hydrophilic polymer is capable of having a moisture vapor transmission rate of greater than or equal to 5,000 grams/meter$^2$/day or greater than or equal to 10,000 grams/meter$^2$/day. The hydrophilic polymer can be a thermoplastic or a crosslinkable polymer. In some embodiments, the hydrophilic polymer is a polyurethane and in further embodiments, the polyurethane is a crosslinked polyurethane. Suitable polyurethane polymers can be, for example, polyesterurethanes, polyetherurethanes or polyether-polyesterurethanes.

In some embodiments where coloring is desired, the color can be add using, for example, a pigmented hydrophilic polymer wherein pigments or dyes have been added to the hydrophilic polymer, resulting in a film having the desired color. In other embodiments, the porous polyethylene film can be colored during the formation of the porous polyethylene membrane according to known methods, for example, master-batching. Therefore, one or both of the porous polyethylene membrane and the hydrophilic membrane can be colored or uncolored. If both the porous polyethylene and the hydrophilic polymer are colored, they can be colored in the same or a similar shade or the colors can be chosen independently of one another. Any of the known pigments or dyes can be used, including organic pigments and dyes, inorganic pigments or dyes, metals, metal oxides, carbon black, titanium dioxide or combinations thereof.

In still further embodiments, the porous polyethylene membrane can be treated with both oleophobic and hydrophilic polymers. For example, in a first step, a first side of the porous polyethylene membrane can be treated with an oleophobic polymer that can coat the walls that define the pores of the porous polyethylene membrane without filling the pores, wherein the oleophobic polymer is provided so that less than the entire thickness of the porous polyethylene membrane is treated with the oleophobic polymer. After an optional drying and curing step for the oleophobic polymer, the second side of the porous polyethylene membrane can be treated with a hydrophilic polymer to fill at least a portion of the remaining thickness of the porous polyethylene membrane, followed by an optional heating and curing step for the hydrophilic polymer and the oleophobic polymer. In these embodiments, the hydrophilic polymer fills only that portion of the porous polyethylene membrane that does not have an oleophobic treatment due to the inability of the hydrophilic polymer to wet the oleophobically treated portion of the porous polyethylene membrane.

In some embodiments, the porous polyethylene membrane may be treated with the oleophobic polymer through greater than or equal to 5 percent of the thickness of the porous polyethylene membrane. In other embodiments, the porous polyethylene membrane may be comprise an oleophobic treatment through less than or equal to 95 percent of its thickness. In still further embodiments, the oleophobic treatment may be present in the range of from 10 to 90 percent of the thickness of the porous polyethylene membrane or from 10 to 80 percent, or from 10 to 70 percent or from 10 to 60 percent or from 10 to 50 percent or from 10 to 40 percent or from 10 to 30 percent or from 10 to 20 percent of the thickness of the porous polyethylene membrane. After treatment of the first side of the porous polyethylene membrane, the second side of the porous polyethylene membrane can be treated with the hydrophilic polymer which can fill any of the remaining thickness of the porous polyethylene membrane and in some embodiments, forms a cap layer of the hydrophilic polymer.

Figure 2:
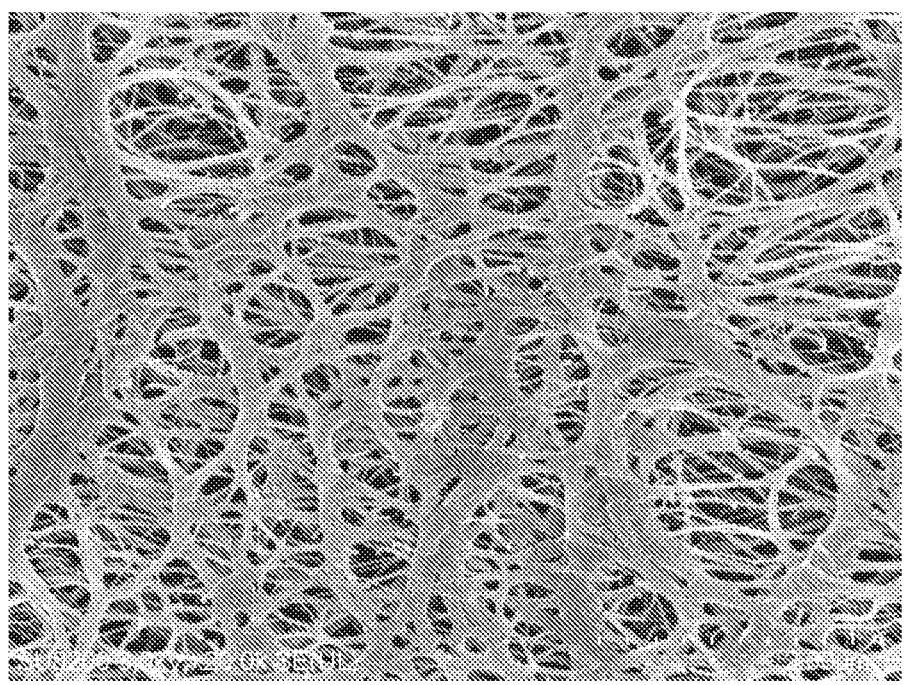
FIG. 2 shows an SEM of the porous polyethylene membrane of FIG. 1 at a higher magnification.
Figure 3:
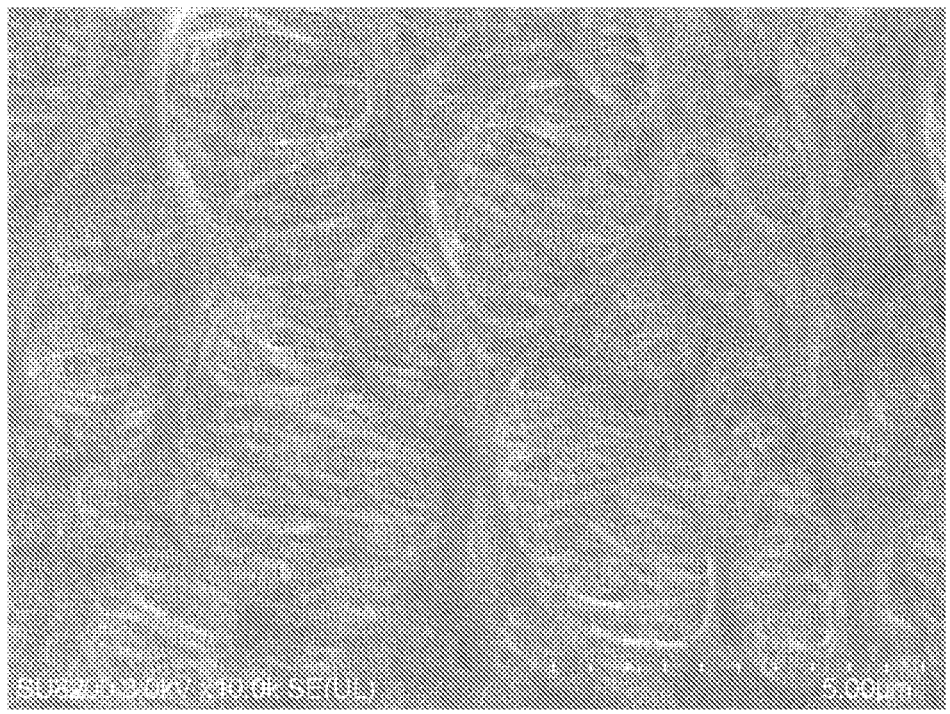
FIG. 3 shows an SEM of a heat treated film, showing a shish-kebab structure.
Figure 4:
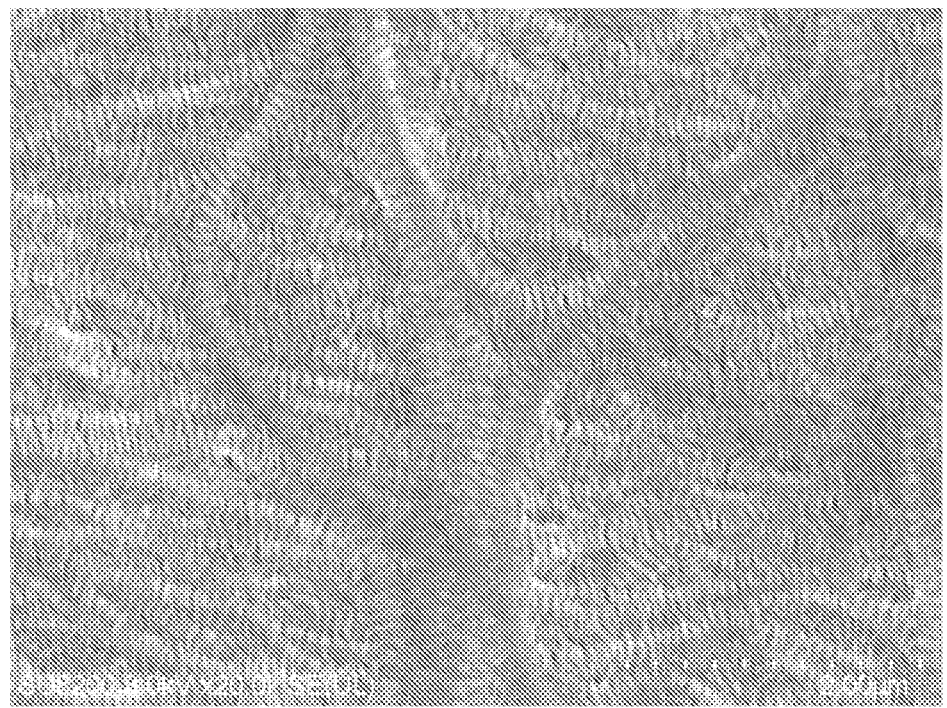
FIG. 4 shows the SEM of FIG. 3 at higher magnification.

After the addition and optional curing of the hydrophilic polymer, the film comprising both the porous polyethylene membrane and the hydrophilic polymer can in certain embodiments be undesirably stiff and noisy when flexed. If these stiff and noisy films are used to make a multilayer laminate, the laminate will also be undesirably stiff and noisy when incorporated in, for example, an article of apparel. It has been found that heating the film comprising the polyethylene membrane and the hydrophilic polymer to a temperature above the melting temperature of the polyethylene for a sufficient time, as described in more detail herein, can result in a multilayer laminate having improved hand and reduced noise, when compared to multilayer laminates that have not received this heat treatment process. The temperature required for this heat treatment is at least 125° C. In other embodiments, the temperature required for the heat treatment is at least 130° C. In still further embodiments, the temperature for the heat treatment step is at least 135° C. or at least 140° C. or at least 145° C. or at least 150° C. or at least 155° C. or at least 160° C. or at least 165° C. or at least 170° C. or at least 175° C. At temperatures above 180° C., the heat treatment temperature may begin to decompose the hydrophilic polymer, depending upon the choice of the hydrophilic polymer. The time required for this heat treatment depends on the heating temperature and on the method used for heating, for example, a heating temperature of 125° C. may require a longer heating time than the case where the heating temperature is 165° C. The minimum heating time required for a given film and heating process can readily be determined by one skilled in the art, provided that the temperature is high enough to be able to melt at least a portion of the polyethylene. In those regions of the film where the polyethylene membrane structure is surrounded or encased by the hydrophilic polymer, no collapse or coalescence of the polyethylene or macro-scale deformation of the polyethylene membrane occurs upon melting of the polyethylene, and the breathability of the film is surprisingly maintained. In some embodiments, for example, porous polyethylene membranes made according to U.S. Pat. No. 9,926,416 and having at least a portion of pores filled by the hydrophilic polymer can undergo the heat treatment step above the melting point of polyethylene and still retain breathability, i.e., retain an MVTR above 5,000 grams/day/meter$^2$. U.S. Pat. No. 9,926,416 is herein incorporated by reference in its entirety. In the case where a portion of the second side of the porous polyethylene membrane is left unfilled with hydrophilic polymer, the heating treatment can create structural changes in the polyethylene membrane that can be seen under magnification. These structural changes may be seen as structures visually resembling stacked or layered sections along the lengths of the fibrils within the microstructure, referred to for simplicity herein as "shish-kebabs. FIGS. 1 and 2 are SEM micrographs of the second side of a film before the heat treatment step and FIGS. 3 and 4 are SEM micrographs of the second side of a film after heat treatment showing the shish-kebab type structures. As shown, these shish-kebab structures appear along the length of the polyethylene fibrils. The shish-kebabs are arranged in a series of relatively short, for example, less than 0.1 micrometer, structures stacked on one another in a direction perpendicular to the original fibril. The width of the shish-kebabs correspond roughly to the width of the original fibril. In some embodiments, the shish-kebab type structures may not be visible, for example, if a cap layer of hydrophilic polymer is present on the first and the second side of the polyethylene membrane, or if the percentage of relatively lower molecular weight polyethylene is too low.

In general, polymers including the polyethylene membrane disclosed herein, have a molecular weight that is reported as one or more of an average molecular weight. The actual molecular weight of the individual polymers will be a distribution of molecular weights and the actual molecular weights of the individual polymers will include a portion that is above and a portion that is below the reported average molecular weight. In the present disclosure, the breathability of the film, as determined by the moisture vapor transmission rate, can be affected by the heat treatment step in combination with the molecular weight of the polyethylene. For example, if a relatively large portion of lower molecular weight polymers is present and the thickness of the unfilled region of the polyethylene membrane is too large, then the heat treatment step can result in deformation, for example, collapse of the unfilled region of the polyethylene membrane and result in a decrease or even a loss of breathability of the film. However, if the average molecular weight of the polyethylene is substantially higher and the molecular weight distribution is small enough so that there is little or no low molecular weight polyethylene, heating the film above the melting temperature of polyethylene may not cause the polyethylene membrane structure to deform or collapse even if the polyethylene structure is not imbibed with hydrophilic polymer. The heat treatment can be done in an oven, by running the film over a heated roll or any other known heat treatment method. It should be noted that this heat treatment step resulting in a change in mechanical properties of the film and possibly in the formation of a shish-kebab structure of the polyethylene membrane can be done at any point after the polyethylene membrane has been coated with hydrophilic polymer and the hydrophilic polymer has solidified. In some embodiments the polyethylene membrane can be coated with hydrophilic polymer to form the film and then the film can be laminated to another layer. Alternatively, in other embodiments the membrane can be laminated to another layer and then the membrane can be coated with hydrophilic polymer. In either embodiment, the heat treatment step can be completed after the film has been made and before, during or after the formation of the laminate.

A film comprising the porous polyethylene membrane and the hydrophilic polymer can be produced according to the steps:
1) providing a porous polyethylene membrane having a weight average molecular weight of greater than 500,000 g/mole, a porosity of at least 40% and a Gurley number of less than 200 seconds;
2) coating at least a portion of the porous polyethylene membrane with a hydrophilic polymer; and
3) heat treating the coated membrane.

In another embodiment, a film can be produced according to the steps:
1) providing a porous polyethylene membrane having a weight average molecular weight of greater than 500,000 g/mole, a porosity of at least 40% and a Gurley number of less than 200 seconds;
2) coating a first side of the porous polyethylene membrane with an oleophobic polymer to coat the walls that define the pores of the porous polyethylene membrane;
3) coating a second side of the porous polyethylene membrane with a hydrophilic polymer to form the film; and
4) heat treating after step 2), after step 3) or both.

In another embodiment, an article can be produced according to the steps:
1) providing a porous polyethylene membrane having a weight average molecular weight of greater than 500,000 g/mole, a porosity of at least 40% and a Gurley number of less than 200 seconds;
2) coating at least a portion of the porous polyethylene membrane with a hydrophilic polymer to form the film;
3) laminating the film to at least one other layer; and
4) heat treating the product of step 2) or 3), or both.

In another embodiment, an article can be produced according to the steps:
1) providing a porous polyethylene membrane having a weight average molecular weight of greater than 500,000 g/mole, a porosity of at least 40% and a Gurley number of less than 200 seconds;
2) laminating at least one other layer to a first side of the porous polyethylene membrane;
3) coating at least a portion of the second side of the porous polyethylene membrane with a hydrophilic polymer; and
4) heat treating the product of step 3.

Optionally, in any of the above methods, the hydrophilic polymer can be cured prior to or during the heat treatment step.

Prior to the heat treatment step, the porous polyethylene membrane with porosity of at least 40% and average molecular weight above 500,000 grams/mole has one or more polyethylene endothermic peaks that are centered above 135° C. and has no polyethylene endothermic peaks centered below 135° C. as determined by differential scanning calorimetry (DSC). Additionally, prior to heat treatment, the disclosed film has one or more polyethylene endothermic peaks that are centered above 135° C. and has no polyethylene endothermic peaks centered below 135° C. as determined by differential scanning calorimetry (DSC). The temperature of the heat treatment step is sufficiently high to melt at least a portion of the polyethylene crystalline content. Upon cooling, the resolidified portion of the melted polyethylene will recrystallize into a different crystalline form with a polyethylene endothermic peak centered at or below 135° C. The time required for the heat treatment to produce a reduction in the noise produced by the film or articles made therefrom, when flexed, will generally decrease as the heat treatment temperature is increased. Heat treatment conditions that cause a greater fraction of the original crystalline content of the porous polyethylene to melt will produce a greater reduction in the noise of the film. After heat treatment of the film, a polyethylene endothermic peak centered below 135° C. will be present. After the heat treatment step, the film or the membrane has at least one polyethylene endothermic peak that can be centered in the range of from greater than or equal to 130° C. and up to and including 135° C. Optionally, one or more polyethylene endothermic peaks above 135° C. can also be present.

The resulting film comprising the porous polyethylene membrane and the hydrophilic polymer can have a moisture vapor transmission rate (MVTR) of greater than or equal to 2500 grams/meter$^2$/day (g/m$^2$/day); a weight of less than 30 grams/meter$^2$ and, optionally, a Gurley of greater than or equal to 1000 seconds. In order to be breathable, i.e., moisture vapor is able to be transported from one side of the film to the other without liquid water moving through the film, the MVTR should be greater than or equal to 2500 g/m$^2$/day. In other embodiments, the film can have an MVTR of greater than or equal to 3000 g/m$^2$/day, greater than or equal to 3500 g/m$^2$/day, greater than or equal to 4000 g/m$^2$/day, greater than or equal to 4500 g/m$^2$/day, greater than or equal to 5000 g/m$^2$/day, greater than or equal to 5500 g/m$^2$/day, greater than or equal to 6000 g/m$^2$/day, greater than or equal to 6500 g/m$^2$/day, greater than or equal to 7000 g/m²/day, greater than or equal to 7500 g/m²/day, greater than or equal to 8000 g/m²/day, greater than or equal to 8500 g/m²/day, greater than or equal to 9000 g/m²/day, greater than or equal to 9500 g/m²/day, or greater than or equal to 10,000 g/m²/day.

The film can also have a ratio of matrix tensile strengths in two orthogonal directions in the range of from 0.5 to 2.0. In other embodiments, the ratio of tensile strengths in two orthogonal directions can be in the range of from 0.7 to 1.4. In still further embodiments, the ratio of tensile strengths can be 0.5, 0.6, 0.7, 0.8, 0.9, 1.0, 1.1, 1.2, 1.3, 1.4, 1.5, 1.6, 1.7, 1.8, 1.9, 2.0 or any value in between those two numbers. The difference in tensile strength in the two orthogonal directions is largely caused by differences in the total strain applied in the two directions during the membrane manufacturing process.

The film can also be contamination resistant due to the presence of the hydrophilic polymer filling voids in at least a portion of the membrane thickness, thereby forming a continuous layer free from voids in that portion of the porous polyethylene membrane. Contamination resistant as used herein means that the films do not become contaminated with sweat, sebum or oils thereby reducing the waterproofness over time. If at least a portion of the pores of the porous polyethylene membrane remain unfilled, then an oleophobic coating on the walls of the unfilled pores can provide contamination resistance to the unfilled pores.

The present disclosure also relates to an article comprising the film. One advantage of an article comprising the film of the present disclosure is that the article can show a reduction in the noise discernible to the human ear, particularly discernible to a comfort specialist detecting sound differences, when compared to films that did not receive the heat treatment step. As used herein, "reduction in noise" means that the article can show a reduction in the noise discernible to the human ear, particularly discernible to a comfort specialist detecting sound differences between the heat treated film and the same film that had not undergone the heat treatment step. If the film is in laminate form, the comfort specialist is also able to discern a reduction in noise level between two laminates, the louder being a laminate wherein the film was not heat treated and compared to the same laminate wherein the film or laminate underwent the heat treatment step. For laminate constructions, other components in the laminate in certain embodiments can contribute to a particular noise level as well.

The article can be a laminate, for example, one or more layers of the film and one or more other layers laminated together to form the laminate. The one or more other layers can be a textile layer, a polymer film layer, a natural leather layer, a synthetic leather layer, a fleece layer or a combination thereof. In some embodiments, the article can be a 2-layer laminate comprising a textile layer adhered to the first side or the second side of the film. In some embodiments, the article can be a 3-layer laminate comprising a first textile layer adhered to the first side of the film and a second textile layer adhered to the second side of the film. In still further embodiments, additional layers can be applied to produce laminates having 4, 5, 6 or more layers. Suitable textile layers can include any woven, knit or nonwoven textile. The textiles may be natural and/or synthetic textile, for example, cotton, wool, silk, jute, polyamide, polyester, acrylic, aramid, viscose, rayon, carbon fiber or a combination thereof. Suitable polymer films can include, for example, polyolefins, polyesters, polyamides, polyurethanes, polyvinyl alcohols, polyvinyl acetates, fluoropolymers, polyvinyl halides, polyvinyl chlorides, epoxy resins, silicon polymers or a combination thereof. Laminates comprising one or more layers of the disclosed film, one or more textile layers and/or one or more polymer film layers can also be produced.

Due to the high strength of the disclosed film, any of the textile or materials listed above and having a relatively low mass can be used to make the laminate. In some embodiments, the laminate can include a relatively low mass textile having a basis weight in the range of from 5 grams/meter² to 30 grams/meter² (gsm). In other embodiments, the textile can have a mass of 6, 7, 8, 9, 10, 11, 12, 13, 14, 15, 16, 17, 18, 19, 20, 21, 22, 23, 24, 25, 26, 27, 28, 29 or 30 gsm or any value in between two of those values. While relatively low mass textiles can be used, textiles having a weight 30 gsm or greater can also be used. For example, relatively high mass textiles having a mass of as high as 500 gsm could be used.

Lamination techniques are well known in the art and can include, for example, adhesive lamination, heat bonding and stitching. In cases wherein a waterproof laminate is needed, stitch bonding may not be desirable, unless care is taken to ensure that the stitch holes are made impenetrable to liquid water, for example, by sealing the stitch holes using seam tape. In some embodiments, the lamination is accomplished via adhesive lamination wherein an adhesive is applied to one or more of the layers to be joined together and the layers are subsequently placed together, optionally with heat and/or pressure, for example, via a nip roller. The adhesive can be applied to the film layer, the textile layer or to both the film and the textile layer. The adhesive can be applied in a discontinuous manner, for example, a series of adhesive dots, shapes, lines or a combination thereof. In other embodiments, the adhesive can be applied as a continuous layer of adhesive. The adhesive composition can in certain embodiments be a thermoplastic or a crosslinkable adhesive. In still further embodiments, the hydrophilic polymer can be used as the adhesive material for the formation of the laminate. For example, after application of the hydrophilic polymer to one side of the porous polyethylene membrane with the formation of a cap layer of the hydrophilic polymer, a textile can be applied to the hydrophilic polymer and heat and/or pressure can be applied to the laminate in order to insure that the hydrophilic polymer sufficiently contacts and adheres to the textile. If the hydrophilic polymer is used as the adhesive for the laminate, then the curing step for the hydrophilic polymer can be performed after the textile or other material is placed on the side of the film containing the hydrophilic polymer cap layer. In some embodiments, a heat press can be used to provide sufficient pressure to allow the hydrophilic polymer to flow into the spaces between the textile fibers and the heat from the heat press can perform the desired curing and heat treatment step to create the laminate. In other embodiments, one or more rollers can provide the necessary pressure and/or heat to accomplish the same tasks, for example, in a continuous manner.

Laminates having stretch and recovery properties can be produced according to known methods. For example, the methods taught in U.S. Pat. Nos. 4,443,511, 9,950,504, 9,126,390, 9,233,520, 9,238,344, WO 2018/67529, the contents of which are incorporated herein by reference in their entireties, all teach methods for imparting stretch in prior membranes and laminate constructions, and these teachings can be adapted to provide stretch into laminates comprising a film(s) of this disclosure.

The articles can be, for example, a garment, an enclosure, a protective enclosure, a tent, a sleeping bag, a bivy bag, a backpack, a pack, a cover and other similar forms benefitting from properties of the films of this disclosure. The garment can be a jacket, a coat, a shirt, pants, a glove, a hat, a shoe, coveralls or at least a portion thereof. Many articles are made from multiple panels that are sewn or otherwise adhered together to form the finished product. Therefore, "at least a portion of" an article means that at least one panel or part of a panel comprises the disclosed film. The articles and garments can be produced so that the film is on the outside of the garment, on the inside of the garment or wherein the film is at least one of the middle layers of the garment, for example, the middle layer of a 3-layer laminate. One advantage to articles and garments comprising the disclosed film is their relatively low noise level. Another advantage of the articles and garments is that they can be waterproof and breathable.

For those embodiments where the film is on the outside of the garment, meaning that it is the outermost portion of the garment, the film can be colored, uncolored, the film can be texturized, the film can be embossed or any combination thereof to produce the desired appearance. Methods of coloring the film have been described herein. In order to emboss the film, the film can be selectively compressed in a random manner or in a non-random manner, for example, a pattern, letters, words, pictures, a sports team logo, a business logo or a combination thereof could be embossed into the membrane or the film either prior to treatment with the hydrophilic polymer or after treatment with the hydrophilic polymer or both. Selectively compressing can result in differing areas of translucency of the film, which can also alter the breathability of the film, with the embossed areas having relatively lower breathability than the non-embossed areas. Suitable methods of embossing can be found in US20080143012, which is herein incorporated by reference in its entirety.

For those embodiments wherein the film is on the outside of the garment, meaning that it is the outermost portion of the garment, at least a portion of the film can be texturized. The film can be texturized by treating the film with a random or a non-random pattern of an abrasion-resistant polymer. The abrasion-resistant polymer can be applied as a series of dots, lines or other shapes in order to provide the desired appearance as well as providing improved abrasion-resistance to the outermost portion of the garment. Suitable abrasion-resistant polymers and methods of applying them can be found in US 2010/0071115, which is incorporated herein by reference in its entirety. Another method for texturizing the film can include the application of flock to at least a portion of the film. Suitable methods of applying flock material can be found in WO 99/39038, which herein is incorporated by reference in its entirety.

It has also been found that the film and articles, for example, laminates comprising the film can be provided with an essentially permanent crease without the need for additional chemistries that are currently in use today. This can be useful, especially in garments comprising the film and at least one textile layer, for example, pants. It has been found that a laminate comprising the film and a textile that has been placed in an embroidery hoop and heated followed by cooling, when removed from the embroidery hoop exhibited a crease at the portion of the laminate where the laminate was secured in the embroidery hoop. The heating temperature should be greater than or equal to 125° C., or greater than or equal to 130° C. and less than or equal to 180° C. In embodiments wherein a crease is desired, for example, in a garment, the crease can be produced by folding the article and pressing with heat.

EXAMPLES

Test Methods

Molecular Weight

Molecular weight determinations were performed according to the procedures given by Mead, D. W., Determination of Molecular Weight Distributions of Linear Flexible Polymers from Linear Viscoelastic Material Functions, Journal of Rheology 1994, 38(6): 1797-1827.

Porosity

Porosity was expressed in percent porosity and was determined by subtracting the quotient of the average density of the porous polyethylene membrane and that of the true density of the polymer from 1, then multiplying that value by 100. For the purposes of this calculation, the true density of polyethylene was taken to be 0.94 grams/cubic centimeter. The density of a sample was calculated by dividing the mass/area of a sample by its thickness.

Moisture Vapor Transmission Rate Test Protocol (MVTR)

MVTR is measured according to DIN EN ISO 15496 (2004). As this is a standard test used in the textile industry, reference is made to the detailed description of the MVTR test disclosed in DIN EN ISO 15496 (2004). For a description of the MVTR test, see also WO 90/04175 A1.

The basic principles are summarized as follows. The sample to be tested together with a highly water vapor permeable, but waterproof microporous membrane is inserted in an annular sample support. Then, the support is immersed in water for 15 minutes (deionized water at 23° C.) such that the membrane contacts the water. A cup is filled with a saturated solution of potassium acetate in water such as to produce a relative humidity of 23% at the surface of the sample and is covered with a second piece of the same waterproof microporous membrane. The cup including the potassium acetate solution and the second membrane is weighed and then placed on top of the sample support such that the second membrane contacts the sample. This leads to a transfer of water vapor through the sample from the side of the water into the cup with the potassium acetate. After 15 minutes, the cup with the potassium acetate is removed and its weight is determined. The same procedure is carried out with the first and second membranes, but without the sample, in order to determine moisture vapor permeability of the test setup without the sample. Then, the MVTR of the sample can be determined from the difference of both measurements, also considering the influence of the two additional microporous membranes.

The moisture vapor transmission rate (MVTR) of the laminate according to the invention was measured in accordance with EN ISO 15496 (2004) and is expressed in $g/m^2/24$ hr. In order to be considered as water vapor permeable as used herein, the laminate should generally have a water vapor permeability of at least 3000 $g/m^2/24$ hr, preferably at least 8000 $g/m^2/24$ hr and more preferably at least 12000 $g/m^2/24$ hr. MVTR values may be as high as 20000 $g/m^2/24$ hr.

Gurley

The Gurley air flow test measures the time in seconds for 100 cm$^3$ of air to flow through a 6.45 cm$^2$ sample at 12.4 cm of water pressure. The samples were measured in a Gurley Densometer Model 4110 Automatic Densometer equipped with a Gurley Model 4320 automated digital timer. The reported results are the average of multiple measurements.

Differential Scanning Calorimetry (DSC)

Differential Scanning Calorimetry data was collected using a TA Instruments Q2000 DSC between 35° C. and 220° C. using a heating rate of 10° C./minute. For films and membranes, 4 millimeter disks were punched out from a bulk sample and placed flat in the pan and the lid was crimped to sandwich the disk between the pan and the lid. A linear integration scheme from 80° C. to 180° C. was used to integrate the melting enthalpy data. Subsequent de-convolution of the melting region was accomplished using the PeakFit software from SeaSolve Software (PeakFit v4.12 for Windows, copyright 2003, SeaSolve Software, Inc.). Standard conditions were used to fit a baseline (after inverting the data to generate "positive" peaks) and subsequently resolve the observed data into its individual melting components.

Matrix Tensile Strength (MTS)

To determine MTS, a sample membrane was cut in the longitudinal and transverse directions using an ASTM D412-Dogbone Die Type F (DD412F). Tensile break load was measured using an INSTRON® 5500R (Illinois Tool Works Inc., Norwood, MA) tensile test machine equipped with flat-faced grips and a "200 lb" (~90.72 kg) load cell. The gauge length for the grips was set to 8.26 cm and a strain rate of 0.847 cm/s or 14.3%/s was used. After placing the sample in the grips, the sample was retracted 1.27 cm to obtain a baseline followed by a tensile test at the aforementioned strain rate. Two samples for each condition were tested individually and the average of the maximum load (i.e., the peak force) measurements was used for the MTS calculation. The longitudinal and transverse MTS were calculated using the following equation:

MTS=(maximum load/cross-sectional area)*(polymer true density/density of the membrane)

Thickness Measurements

Membrane thickness was measured by placing the membrane between the two plates of a Kafer FZ1000/30 thickness snap gauge (Käfer Messuhrenfabrik GmbH, Villingen-Schwenningen, Germany). The average of the three measurements was used.

Mass Per Unit Area (in Gram/Meter$^2$)

The mass per area (mass/area) of a sample was calculated by measuring the mass of a well-defined area of the sample using a scale. The sample was cut to a defined area using a die or any precise cutting instrument.

Example 1

A 30 micrometer thick polyethylene membrane (available from Gelon LIB Co., Ltd in China) having a weight average molecular weight of 769,000 grams/mole was stretched in the machine direction (MD) 2.25:1 and then stretched in the transverse direction (TD) 9:1. The resulting porous polyethylene membrane had a mass per unit area of 2.1 grams/meter$^2$ (gsm), a thickness of 10 microns, a Gurley of 8.7 seconds and a porosity of 78%. This stretched polyethylene membrane was then laminated to a polyester fabric (available from Nanya, article #J47P) using a non-water permeable polyurethane adhesive that was applied in a discrete dot pattern using a gravure coating roll. The polyurethane adhesive covered approximately 35% of the membrane surface area. This laminate was then allowed to cure in roll form for two days.

The membrane in this 2-layer (2 L) laminate was then gravure coated with 17 gsm of a hydrophilic polyurethane pre-polymer mixture containing a thermally activated curing agent. The polyurethane coated laminate was then sent through an infrared oven for approximately 20 seconds to activate the curing agent and crosslink the polyurethane to produce a tack-free surface. The film was then wound into a roll. The roll of polyurethane coated laminate was left to fully cure in roll form for two days. A portion of this fully cured laminate sample was then heated by running it over a series of three chrome rolls that were each maintained at 155° C. surface temperature. The total dwell time of the laminate on the chrome rolls was 22 seconds.

Samples of the laminate that did not receive the final heat treatment on the chrome rolls and the laminate that did receive the heat treatment were submitted for noise testing. A comfort specialist was able to discern the difference in noise between the non-heat treated laminate and the noise for the heat treated laminate and determine that the heat treated laminate produced less noise compared to the non-heat treated laminate.

Example 2

A 30 micrometer thick polyethylene membrane (available from Gelon LIB Co., Ltd in China) having a weight average molecular weight of 769,000 grams/mole was stretched in the machine direction (MD) 2.25:1 and then stretched in the transverse direction (TD) 9:1. The resulting porous polyethylene membrane had a mass per unit area of 2.1 gsm, a thickness of 10 microns, a Gurley of 8.7 seconds and a porosity of 78%. This porous polyethylene membrane was gravure coated with 16.6 gsm of a hydrophilic polyurethane pre-polymer mixture containing a thermally activated curing agent. The polyurethane coated membrane was then sent through an infrared oven for approximately 20 seconds to activate the curing agent and crosslink the polyurethane to produce a tack-free surface. The film was then wound into a roll. The roll of polyurethane coated film was left to fully cure in roll form for two days. A portion of this fully cured film was clamped in a wooden hoop and then heated in a convection oven at 170° C. for 2 minutes.

Samples of the polyurethane coated film was analyzed by DSC before and after the heat treatment step. The non-heat treated film showed only one endothermic polyethylene peak centered at 139.6° C. The heat treated film showed an endothermic polyethylene peak centered at 131.0° C.

Example 3

A 30 micron thick polyethylene membrane (available from Gelon LIB co., Ltd in China) having a weight average molecular weight of 769,000 grams/mole was stretched in the MD 1.5:1 and then stretched in the TD 5:1 The resulting polyethylene membrane mass was 4.1 gsm, the thickness was 13.9 microns, the Gurley was 32.7 seconds and the porosity was 69%. This stretched polyethylene membrane was then laminated to a polyester fabric (Purchased from Nanya, article #J47P) using a non-water permeable polyurethane adhesive that was applied in a discrete dot pattern using a gravure coating roll. The polyurethane adhesive covered approximately 35% of the membrane surface area. This 2-layer laminate was then allowed to cure in roll form for two days.

The membrane in this 2 L laminate was then gravure coated with 13 gsm of a hydrophilic polyurethane prepolymer mixture containing a thermally activated curing agent. The polyurethane coated laminate was then sent through an infrared oven for approximately 20 seconds to activate the curing agent and crosslink the polyurethane to produce a tack-free surface. The surface cured film was then wound into a roll. The roll of polyurethane coated laminate was left to fully cure in roll form for two days. A portion of this fully cured laminate sample was then heated by running it over a series of three chrome rolls that were each maintained at 155° C. surface temperature. The total dwell time of the laminate on the chrome rolls was 22 seconds.

Samples of the laminate that did not receive the final heat treatment on the chrome rolls and the laminate that did receive the heat treatment were submitted for noise testing. A comfort specialist was able to discern the difference in noise between the non-heat treated laminate and the noise for the heat treated laminate and determine that the heat treated laminate produced less noise compared to the non-heat treated laminate.

Example 4

A 30 micron thick polyethylene membrane (available from Gelon LIB co., Ltd in China) having a weight average molecular weight of 769,000 grams/mole was stretched in the MD 1.5:1 and then stretched in the TD 5:1. The resulting polyethylene membrane mass was 4.1 gsm, the thickness was 13.9 microns, the Gurley was 32.7 seconds and the porosity was 69%. The polyethylene membrane was then coated with 17 gsm of a moisture cured hydrophilic polyurethane pre-polymer mixture using a roll coating apparatus. The coating was continuous and uniform over the surface of the polyethylene membrane. In the same processing sequence, the same type of polyester fabric used in Example 1 (available from Nanya, article #J47P) was laminated to the coated side of the PE membrane by feeding the fabric and the coated membrane between two adjacent chrome rolls so that the fabric was pressed against the uncured polyurethane mixture. The laminate was then allowed to cure in roll form for two days. A portion of this laminate sample was then heated by running it over a series of three chrome rolls that were each maintained at 155° C. surface temperature. The total dwell time of the laminate on the chrome rolls was 22 seconds.

Samples of the laminate that did not receive the final heat treatment on the chrome rolls and the laminate that did receive the heat treatment were submitted for noise testing. A comfort specialist was able to discern the difference in noise between the non-heat treated laminate and the noise for the heat treated laminate and determine that the heat treated laminate produced less noise compared to the non-heat treated laminate.

Example 5

A porous polyethylene membrane having a weight of 4.0 gsm, having a weight average molecular weight of $3.15 \times 10^6$ grams/mole, a porosity of 67% and a Gurley number of 68 seconds was laminated to a fabric using a moisture curing polyurethane adhesive. The laminate was allowed to cure for 2 days at ambient temperature. The laminate was then coated with 17 gsm of a hydrophilic polyurethane prepolymer mixture. After curing on a roll for 2 days, a portion of the laminate comprising the film was heat treated by running it over a chrome roll with a surface temperature of 155° C. The dwell time of the film on the hot roll surface was 15.7 seconds.

When analyzed for noise, a reduction in noise was discerned for the heat treated laminate compared to the non-heat treated laminate.

Example 6

A porous polyethylene membrane having a weight of 4.0 gsm, having a weight average molecular weight of $3.15 \times 10^6$ grams/mole, a porosity of 67% and a Gurley number of 68 seconds was laminated to a fabric using a moisture curing polyurethane adhesive. The laminate was allowed to cure for 2 days at ambient temperature. The laminate was then coated with 13 gsm of a hydrophilic polyurethane prepolymer mixture. After curing on a roll for 2 days, a portion of the laminate comprising the film was heat treated by running it over a chrome roll with a surface temperature of 155° C. The dwell time of the film on the hot roll surface was 15.7 seconds.

When analyzed for noise, a reduction in noise was discerned for the heat treated laminate compared to the non-heat treated laminate.

Example 7

A porous polyethylene membrane having a weight of 2.4 gsm, having a weight average molecular weight of $7.84 \times 10^6$ grams/mole, a porosity of 61% and a Gurley number of 59.5 seconds was coated with 13 gsm of a hydrophilic polyurethane prepolymer mixture. After curing on a roll for 2 days, the film was laminated to a fabric using a moisture curing polyurethane adhesive. A portion of this laminate was heat treated by clamping it in a wooden hoop in order to constrain it in the x-y direction. The laminate was placed in a convection oven set to a temperature of 165° C. for 2 minutes.

When analyzed for noise, a reduction in noise was discerned for the heat treated laminate compared to the non-heat treated laminate. DSC of the non-heat treated sample showed a polyethylene endothermic peak of 139.7° C. DSC of the heat treated sample showed polyethylene endothermic peaks of 132.2° C.

Example 8

A porous polyethylene membrane having a weight of 2.4 gsm, having a weight average molecular weight of $7.84 \times 10^6$ grams/mole, a porosity of 63% and a Gurley number of 59.5 sec was coated on a first side of the polyethylene membrane with 6.5 gsm of a moisture curable hydrophilic polyurethane pre-polymer mixture using a roll coating apparatus. The coating was continuous and uniform over the surface of the polyethylene membrane. In the same processing sequence a nylon circular knit fabric was laminated to the polyurethane coated side of the PE membrane by feeding the fabric and the coated membrane between two adjacent chrome rolls so that the fabric was pressed against the uncured polyurethane mixture. The laminate was then allowed to cure in roll form for two days. This two layer laminate was then laminated to a nylon woven fabric using a non-water permeable polyurethane adhesive that was applied in a discrete dot pattern using a gravure coating roll. The woven fabric was laminated to the second side of the polyethylene membrane. The polyurethane adhesive covered approximately 35% of the membrane surface area. This three layer laminate was then allowed to cure in roll form for two days.

A portion of this laminate sample was then heated by running it over a series of three chrome rolls that were each maintained at 160° C. surface temperature. The total dwell time of the laminate on the chrome rolls was 20 seconds.

Samples of the laminate that did not receive the final heat treatment on the chrome rolls and the laminate that did receive the heat treatment were submitted for noise testing. A comfort specialist was able to discern the difference in noise between the non-heat treated laminate and the noise for the heat treated laminate and determine that the heat treated laminate produced less noise compared to the non-heat treated laminate.

Figure 5:
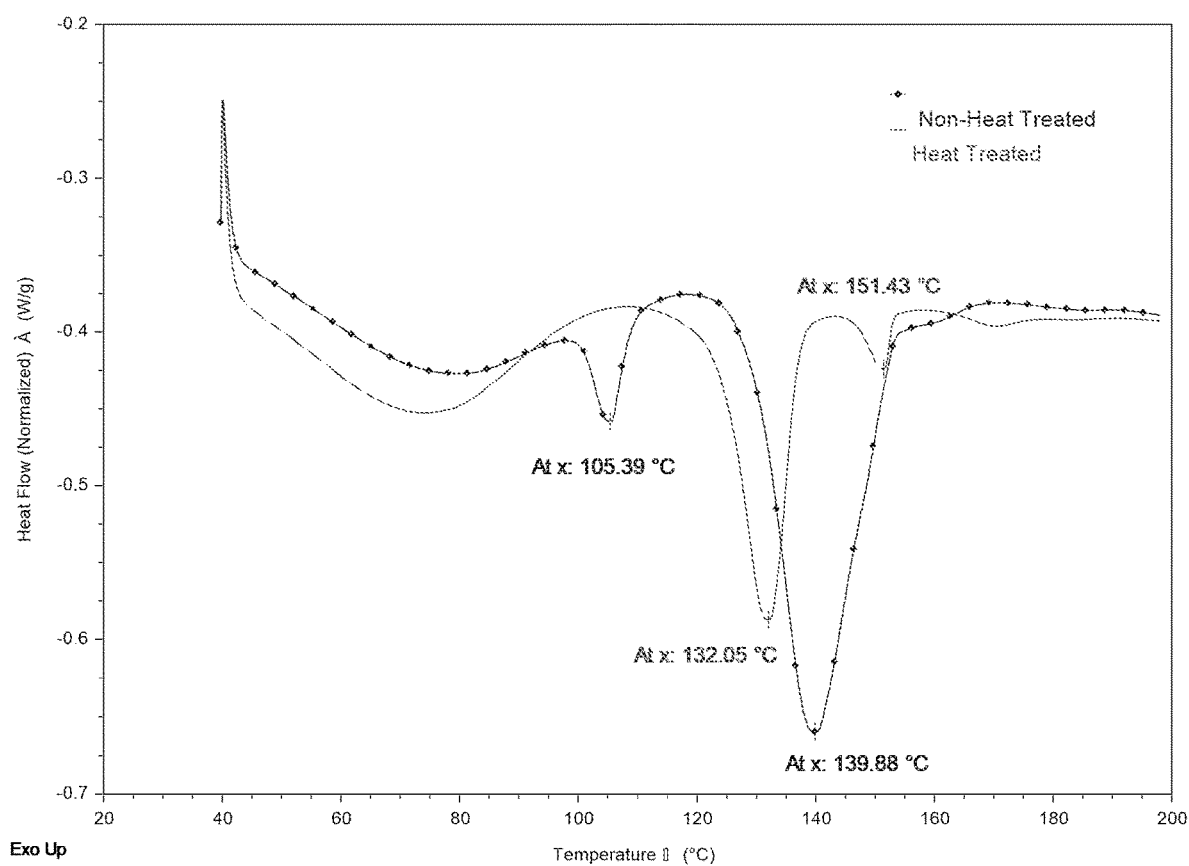
FIG. 5 shows a differential scanning calorimetry (DSC) data for Example 8.

The films from both the heat treated and the non-heat treated laminates were removed by peeling away the two fabric layers. These non-heat treated and heat treated film samples were submitted for DSC analysis. FIG. 5 shows the DSC curves for both films. This plot has a vertical line at 135 C for reference. The non-heat treated film shows a polyethylene endothermic peak at 139.88° C. The curve also contains an endothermic peak at 105.39° C. This 105.39 C endothermic peak is caused by residue of the non-water permeable polyurethane adhesive on the composite film surface and is not caused by the polyethylene. Independent DSC analysis of this non-water permeable polyurethane adhesive shows an endothermic peak at 105.4 C. The heat treated film shows two polyethylene endothermic peaks, one at 132.05° C. and one at 151.43° C. The peak at 151.43° C. represents the portion of the original crystalline polyethylene structure that did not melt during heat treatment. The endothermic peak at 132.05° C. represents the portion of the polyethylene that melted during heat treatment and then recrystallized.

Comparative A

A Columbia Omni-Dry Peak 2 Peak Waterproof jacket (Columbia Sportswear Company) was purchased. The garment was a 3 L laminate and contained a woven outer and inner knit textile that were both laminated to a polyethylene membrane. The inner fabric portion of the sample was a relatively light weight knit. A portion of the jacket was cut out and that portion was clamped in a wooden fabric hoop. The sample was placed in an oven heated to a temperature of 165° C. for 2 minutes. After 2 minutes, the sample was removed and allowed to cool. The knit side of the both the heat treated sample and the non-heat treated control sample was viewed under an optical microscope. The heat treated sample showed that the membrane (visible through the inner knit fabric) contained holes. No holes were visible in the non-heat treated control sample.

The invention claimed is:

1. A film comprising:
   A) a porous polyethylene membrane,
      wherein the porous polyethylene membrane comprises polyethylene,
      wherein the polyethylene has a weight average molecular weight of greater than 500,000 grams/mole,
      wherein the porous polyethylene membrane has a porosity of at least 40%, and
      wherein the porous polyethylene membrane has a Gurley number of less than 200 seconds; and
   B) a hydrophilic polymer,
      wherein the hydrophilic polymer fills at least a portion of the pores of the porous polyethylene membrane;
   wherein the film comprises
      a) a moisture vapor transmission rate of greater than or equal to 2500 grams/meter$^2$/day;
      b) a weight of less than 30 grams/meter$^2$.

2. The film of claim 1 wherein the polyethylene membrane has a first side and a second side and the hydrophilic polymer is applied to the first side of the polyethylene membrane resulting in filling at least a portion of the pores and a cap layer of the hydrophilic polymer on the first side of the polyethylene membrane.

3. The film of claim 2 wherein the second side of the polyethylene membrane displays a shish-kebab structure.

4. The film of claim 1 wherein substantially all of the pores in the porous polyethylene membrane are filled with the hydrophilic polymer.

5. The film of claim 1 wherein the hydrophilic polymer is a polyurethane, polyamide, polyester, ionomer, or a copolymer or a copolymer or a combination thereof.

6. The film of claim 1 wherein the porous polyethylene membrane comprises a weight of less than 10 grams/meter$^2$.

7. The film of claim 1 wherein the porous polyethylene membrane comprises a porosity of greater than or equal to 60%.

8. The film of claim 1 wherein a weight ratio of hydrophilic polymer to porous polyethylene is in a range of from 30 to 0.5.

9. An article comprising the film of claim 1.

10. The article of claim 9 wherein the film is a laminate comprising at least one other layer that is adjacent to the film.

11. The article of claim 10 wherein the at least one other layer is a textile layer, a polymer film layer, a natural leather layer, a synthetic leather layer, a fleece layer or a combination thereof.

12. The article of claim 10 wherein the at least one other layer is a textile layer.

13. The article of claim 10 wherein layers of the laminate are adhered to one another using a continuous or a discontinuous adhesive.

14. The article of claim 13 wherein the adhesive is a thermoplastic or a crosslinkable adhesive.

15. The article of claim 9 wherein the article is a garment.

16. The article of claim 15 wherein the garment is a jacket, a coat, a shirt, pants, a glove, a hat, a shoe, coveralls or at least a portion thereof.

17. The article of claim 15 wherein the film is on an exterior of the garment or the film is not on the exterior of the garment.

18. The article of claim 15 wherein the garment is waterproof.

* * * * *